United States Patent [19]
Roselli et al.

[11] Patent Number: 5,570,284
[45] Date of Patent: Oct. 29, 1996

[54] METHOD AND APPARATUS FOR REMOTE CONTROL OF A LOCOMOTIVE THROTTLE CONTROLLER

[75] Inventors: Leonard Roselli, Murrysville; Daniel J. Wolf, Pittsburgh; Gregory S. Balukin, Pittsburgh; John Pfaff, Pittsburgh, all of Pa.

[73] Assignee: Westinghouse Air Brake Company, Wilmerding, Pa.

[21] Appl. No.: 349,320

[22] Filed: Dec. 5, 1994

[51] Int. Cl.⁶ .................................................. B61K 13/00
[52] U.S. Cl. ........................... 364/424.01; 364/424.05; 364/426.05; 364/436; 364/132; 246/187 C
[58] Field of Search ............... 364/424.01, 424.05, 364/424.04, 426.05, 436, 132, 138; 246/187 C

[56] References Cited

U.S. PATENT DOCUMENTS

| | | | |
|---|---|---|---|
| 3,715,579 | 2/1973 | Eblovi | 246/187 A |
| 3,794,834 | 2/1974 | Auer et al. | 246/187 A |
| 3,805,056 | 4/1974 | Birkin | 246/187 B |
| 4,582,280 | 4/1986 | Nichols et al. | 246/182 R |
| 4,845,667 | 7/1989 | Höptner et al. | 364/900 |
| 4,875,168 | 10/1989 | Martin | 364/431.01 |
| 5,016,840 | 5/1991 | Bezos | 246/187 R |
| 5,039,038 | 8/1991 | Nichols et al. | 246/3 |
| 5,053,964 | 10/1991 | Mister et al. | 364/424.01 |
| 5,280,498 | 1/1994 | Tymes et al. | 375/1 |
| 5,479,441 | 12/1995 | Tymes et al. | 375/200 |

*Primary Examiner*—Kevin J. Teska
*Assistant Examiner*—Stephen J. Walder, Jr.
*Attorney, Agent, or Firm*—James Ray & Associates

[57] ABSTRACT

A protocol is provided for bi-directional communication of control signals between a host unit and a slave unit. The protocol is particularly adapted to the control of a locomotive from a remote host computer.

The protocol provides for transmission of digital signals indicative of control commands from the host computer to the slave computer, and simultaneous transmission of digital signals indicative of diagnostic information from the slave computer to the host computer.

Information is transmitted in the form of data packets, and means are provided, in the receiving computer, for detecting corruption of transmission, or loss of transmission, and for providing a safe response to either of such conditions.

24 Claims, 1 Drawing Sheet

METHOD AND APPARATUS FOR REMOTE CONTROL OF A LOCOMOTIVE THROTTLE CONTROLLER

CROSS REFERENCE TO RELATED APPLICATIONS

The invention taught in this patent application is closely related to the inventions taught in the following copending patent applications: Ser. No. 08/340,525 Electronically Controlled Locomotive Throttle Controller Including Remote Multiple Unit Throttle Control; Ser. No. 08/340,651 now U.S. Pat. No. 5,519,299, Method And Apparatus For Determining And Encoding The Position Of A Reverser Handle On A Locomotive Control Stand; Ser. No. 08/340,235 now U.S. Pat. No. 5,537,285, Digital Output Control Device and Method For Operating; Ser. No. 08/340,239 Method And Apparatus For Feedback Of Trainline Status To The Central Processor Of A Locomotive Throttle Controller; Ser. No. 08/340,215 Apparatus For Interlocking Throttle, Dynamic Brake And Reverser Handles On A Control Stand Of A Railway Locomotive; Ser. No. 08/340,652 Method Of Performing Diagnostics On An Electronically Controlled Railway Locomotive Throttle Controller; Ser. No. 08/340,237 now U.S. Pat. No. 5,500,799, Method Of Operating A Locomotive Mounted Throttle Controller Between Two Modes Of Operation Including A Transition Between Such Two Modes; Ser. No. 08/340,742 An Apparatus For And A Method Of Generating An Analog Signal For Control Of Dynamic Braking; Ser. No. 08/340,232 now U.S. Pat. No. 5,537,014, An Apparatus For Feedback Of An Analog Signal Used To Monitor And/Or Control Dynamic Braking and Method of Operating; Ser. No. 08/340,213 An Apparatus To Enable Controlling A Throttle Controller From A Remote Host; Ser. NO. 08/340,538 Apparatus For Interlocking Reverser Handle On A Control Stand Of A Railway Locomotive; and Ser. No. 08/340,526 Apparatus For Determining The Absolute Position Of Throttle, Dynamic Brake And Reverser Handles On A Locomotive Control Stand. Each of the above-referenced patent applications is being filed concurrently herewith and is assigned to the assignee of this invention. The teachings of all of these patent applications are incorporated herein by reference.

FIELD OF THE INVENTION

This invention applies most broadly to the field of communications protocols, and more narrowly to a protocol for communication between a locomotive throttle controller and a remote host computer. It provides for the transmission of engine control commands from the remote host computer to the throttle controller, and for feedback of diagnostic information including trainline status from the throttle controller to the remote host computer. It applies to any type of serial, two-way communications channel, including hard-wired and radio link.

BACKGROUND OF THE INVENTION

Prior to the present invention, it is generally well known in the railway industry, that the throttle controller assemblies used in a railway type locomotive are almost exclusively of the electro-mechanical type. Engine control information originating in the engineer's console as handle positions is converted to electrical signals by mechanical switches, and thence conveyed to the throttle controller, which applies electrical signals to the trainlines which control the locomotive. For remote operation by radio link from a lead locomotive to a slave locomotive, it has been necessary to utilize a dedicated boxcar with the slave locomotive to accommodate radio equipment and relays. The information transmitted from the lead locomotive to the slave locomotive has been rigorously defined by hardware structure. Likewise, diagnostic information sent from the slave locomotive back to the lead locomotive has been rigorously defined by hardware structure. In the prior art, the diagnostic information has consisted of (1) hot engine, (2) brake warning, (3) wheel slip, and (4) ground fault. No method has hitherto been available for transmitting diagnostic information concerning the status of the trainlines fro the slave locomotive back to the lead locomotive.

Likewise, no method has been available for adding new information to the information transmitted from the lead locomotive to the slave locomotive, or back from the slave locomotive to the lead locomotive.

It can be seen from the above discussion of the prior art electro mechanical type throttle controller assemblies, presently used in the railroad industry that there is an unfilled need which exists in the modern railroad industry for an improved communications protocol which will enable feedback of diagnostic information concerning trainline status from the throttle controller to the remote host computer.

There is also a need to provide a convenient means in the future for adding additional information for transmission from the remote host computer to the throttle controller, and from the throttle controller to the remote host. It is evident that this need has been addressed by the present invention.

SUMMARY OF THE INVENTION

This invention applies to electronic control systems wherein a master unit and a slave unit are in communication. The master unit sends commands to the slave unit, and the slave unit sends diagnostic information back to the master unit. This invention provides a protocol for sending packets of digital information from the master unit to the slave unit and from the slave unit to the master unit. Provision is made for detecting and responding to either interruption of communication or corruption of communication.

In one aspect of this invention, a process is provided whereby a master unit having a digital computer can transmit control information to a slave unit which also has a digital computer. Information for control of a slave unit is placed in the memory of the master unit. This may be done by entry on a keyboard of the master unit, or by any one of a number of commercially-available devices such as a joystick, a mouse, digitizer pad, etc. Alternatively, information may be supplied by control levers having optical encoders which provide signals indicative of lever position to the computer in the master unit. This information is placed in the memory of the master unit.

Software instructions in the master unit cause this information to be formed into data packets. The data packets are comprised of bytes disposed sequentially in time. These bytes are sequentially transmitted in an asynchronous manner over a single transmission path to a computer in the slave unit. The data packets start with two bytes which serve as a start flag. Next, a byte is provided as an address for the information. In the case of point-to-point communication, this byte is not used. It is reserved for future applications. Next is a control flag which indicates the type of data packet. Bytes of data which represent the control information are then transmitted. As each byte is transmitted, calculations are made for a cyclic redundancy check, which results in an integer, referred to as the CRC. After all the bytes of the control information are transmitted, the CRC is transmitted. After the CRC, an end flag is transmitted, which indicates an end to the data packet.

Data packets of the type described above are transmitted at time intervals no greater than a maximum time interval which is known in both the master and the slave units. This is done so that the data packets serve a "heartbeat" function. As they are received in the slave unit, they provide verification that the communication line is still functioning.

The data packets are received in the slave unit, and the bytes of information representing control signals are placed in a buffer in the memory of the slave unit. As each byte is received, the CRC is calculated using the same procedure as was used in the master unit. The calculated value for the CRC is then compared with the value received from the master unit. If they are identical, the bytes of control information are accepted as valid, and placed in the memory of the slave computer where they are available to the software as control signals.

If the calculated value for the CRC is not equal to the transmitted value, a watchdog is tripped which indicates corrupted transmission. Likewise, if the time interval between two data packets is greater than the known maximum time interval between packets, a watchdog is tripped which indicates loss of transmission.

This invention also provides for transmission of information from the slave unit back to the master unit. This, generally, is diagnostic information. Information is transmitted in the form of packets of bytes from the slave unit to the master unit in the same manner as the transmission from the master unit to the slave unit. The slave unit sends information asynchronously over a second transmission path to the master unit. As before, a CRC is provided to verify the received data, and packets are transmitted at time intervals no longer than a known maximum time interval. Again, a watchdog is tripped if the data received has been corrupted, or if a packet is not received within the known maximum time interval after the previous packet was received.

If a single corrupted data packet is received by either the slave unit or the master unit, it is ignored, and the receiving unit waits for the next data packet, which may be valid.

If either computer continues to receive corrupted data, or experiences an extended loss of data, it initiates a remedial procedure in which it sends a signal to the other computer indicating the problem. Both computers then re-initialize themselves based on information in non-volatile memory, perhaps with the addition of information in mass storage such as disk storage.

If, after one or more tries at re-initializing, valid communication cannot be re-established, the slave unit places its control signals in a known, safe mode. An indication is then provided for a human operator who controls the master unit.

This invention applies more particularly to the control of a locomotive from a remote host computer. A throttle controller is provided, which has a digital computer. A method is provided for two-way transmission of signals representing digital data packets between the remote host computer and the computer in the throttle controller. Signals representing digital data packets indicative of engine control commands are transmitted from the remote host computer to the computer in the throttle controller. This is done with a time interval between packets no greater than a known maximum time interval. In the throttle controller, means are provided for driving signals on trainlines of the locomotive based on the data packets which represent engine control commands. Means are provided for determining whether the transmitted information has been corrupted or lost, and for safely responding to such conditions.

In the event that transmission from the host computer to the computer in the throttle controller has been corrupted or interrupted, the computer in the throttle controller re-initializes itself based on instructions in its non-volatile memory, perhaps also with information in mass storage, such as disk storage. This computer also sends a signal back to the host computer indicating the problem, so the host computer likewise re-initializes itself.

In the event that valid communication cannot be re-established, the computer in the throttle controller steps the locomotive to a known power setting, which may be throttle idle, reverser neutral and dynamic brake off. Another option is to leave the dynamic brake on if it was on when communication was lost.

In order to determine whether corruption of transmission has occurred, a cyclic redundancy check is made in accordance with the following reference. "C Programmer's Guide to Serial Communications", by Joe Campbell, Published by Howard W. Sams, Inc. 1987. This work is hereby incorporated in its entirety by reference.

The reference includes a table on Page 5 which is referred to as the CCITT polynomial. The table has 256 entries, each of which is a two-byte integer. A computer which is using a cyclic redundancy check can either use this table by table look-up, or calculate its values as needed from the polynomial.

The cyclic redundancy check is made as follows: For each packet of information which is sent out, the CRC, which is a two-byte integer, is given an initial value which is known both to the sending computer and the receiving computer. The bytes of useful information in the packet are then processed in sequence, and as each byte is encountered, the CRC is re-calculated according to the procedure below. The procedure involves an exclusive OR procedure. When two bits (each having a value of 0 or 1) are compared in an exclusive OR procedure, the result is 1 if either, but not both of the bits has the value 1. When two integers of equal length are compared by an exclusive OR procedure, their bits are compared respectively in an exclusive OR, and the resulting bits, in sequence, create a new integer having the same length as the integers being compared.

The procedure for calculating new values for the CRC is as follows:

The most significant byte of the CRC is compared in an exclusive OR procedure with the byte in the data packet being processed. The resulting byte is used as a pointer to a value in the CCITT table, cited above. This table entry is a two-byte integer. Another two-byte integer is obtained from the least significant byte of the CRC. This byte is shifted left eight bits, and eight zeroes are inserted in its place. This two-byte integer is then compared with the table entry, also a two-byte integer in an exclusive OR procedure, to obtain a final two-byte integer. This is the new value for the CRC. After all the bytes of control data in the packet have been processed, the two bytes of the CRC are attached, two bytes which serve as an end flag are attached, and the packet is transmitted.

An identical calculation is performed in the receiving computer. The CRC is first initialized at its known initial value. As each byte of useful information is received, the CRC is re-calculated using the same procedure as used by the sending computer. After all the bytes have been received, and used to re-calculate the CRC, the calculated CRC is compared with the CRC received from the transmitting computer to determine whether information in the data packet has been corrupted.

In order to detect loss of transmission from the sending computer to the receiving computer, a timer is reset in the receiving computer whenever a data packet is received. The timer generates a signal indicative of the time elapsed since it was last reset. By monitoring that signal, the receiving computer has information which indicates whether an excessive time has elapsed since the previous data packet was received.

In another aspect of this invention, a method is provided for transmitting diagnostic information from the throttle controller back to the remote host computer. This information may include from the prior art: (1) hot engine, (2) brake warning, (3) wheel slip and (4) ground fault. It may also include the status of the trainlines, that is, information regarding the actual voltages on the trainlines. This information is encoded in data packets and transmitted back to the host computer in the manner discussed above.

The data packets which this method provides are structured in a manner somewhat similar to HDLC frames. There are, however, some major differences. For one thing, the HDLC system is synchronous. The system of the present invention is asynchronous. An additional difference is that in HDLC, when a data packet is not being transmitted, bytes equal to Hex 7E are continuously transmitted. (In binary, this number is 01111110.) In the present system, when a data packet is not being transmitted, no changing signal is sent.

For the present invention, the start of a packet is indicated by two standard bytes, ASCII <DLE> and <STX>, which have the numeric values of 16 and 2.

For HDLC, the start of a packet is indicated by an address byte, and a byte which provides 2 bits for packet type and two sequence numbers of 3 bits each. One of these is to label the packet being transmitted, and one to reference a previously-received packet.

The system of the present invention does not provide reference numbers for the packets because generally, successive packets carry the same type of information.

After the two bytes which begin the packet, the present invention has a byte reserved for address, and a byte for packet type, which in present embodiments, is set to 3.

In both the HDLC frames, and in the packets of the present invention, a string of useful data bytes follow, and then bytes for a cyclic redundancy check. In the HDLC system, there can be either 2 or 4 bytes for CRC. In the present system, there are 2 bytes.

In the HDLC system, after the CRC bytes of the data frame, the sending computer returns to the process of transmitting bytes equal to Hex 7E. In the present system, after the CRC bytes of the data packet, an end flag is transmitted. This consists of the bytes <DLE><ETX>, which have the numeric values 16 and 3. After the end flag, for the present invention, no changing signal is sent.

The present invention is similar to the HDLC system in that the CRC bytes are not identified as being distinct from the data being transmitted, until the end of the packet is encountered. In either case, when the end of the packet is encountered, the CRC bytes are identified as such.

In the present invention, bytes of data being transmitted may have the same values as the <DLE><ETX>. To prevent ambiguity, a byte-stuffing technique is employed. In the sending computer, whenever a byte with the same value as <DLE>, which is 16 is encountered, the value is transmitted twice in succession. This distinguishes it from the end flag, where the values would be 16 and 3. In the receiving computer, the two values of 16, encountered in sequence, are interpreted as a single value of 16.

The method of communicating between the remote host computer and the computer in the slave unit does not require communication lines for handshaking functions. In fact, two-way communication can be accomplished using only three electric conduction paths.

A signal can be sent from the host computer to the slave computer using one of the three conduction paths. At the same time, the slave computer can be sending signals to the host computer on a second one of the three conduction paths, while the third conduction path serves as current return for both signals.

Since no communication lines are needed for handshaking functions, it is also possible to provide communication over a two-way radio link.

Although, in general, the packets of data transmitted, convey the same type of information, a method is provided for transmitting a data packet from the host computer to the slave computer which provides date and time information. A header byte is transmitted with the data bytes, which indicates that the information is date and time. In the slave computer, then, the information, after CRC checking, is placed in the areas of memory reserved for date and time.

For the application to a locomotive throttle controller, signals are transmitted representing digital data packets which contain information indicative of the requested setting for engine throttle, reverser position, and dynamic braking.

Since there is a requirement that control levers in the slave locomotive be in a home position (throttle idle, reverser in neutral and dynamic brake off), for remote operation to be possible, signals indicative of these control lever positions are transmitted, along with diagnostic information such as trainline status, from the throttle controller to the remote host computer.

An additional aspect of this invention is an apparatus for controlling a locomotive from a remote host computer. The locomotive is provided with a throttle controller which has at its heart a central processor digital computer. This computer sends signals to an output driver stage which applies voltages to the trainlines which control the locomotive, and perhaps, other locomotives in a consist.

The throttle controller can be used either for local command, or for remote command. When used for local command, engine control commands are obtained from the engineer's console. For remote command, engine control commands are obtained via a suitable transmission means from a remote host computer.

The remote host computer has apparatus, including software instructions, for receiving engine-control commands from a human operator, and for placing these commands in its memory.

As an example of a remote host computer, this item could be a PC or lap top computer. With suitable software, commands can be inserted by a human operator using a keyboard or keypad, or a joystick, mouse, or digitizing pad.

The remote host computer has software which utilizes the engine-control commands in its memory. These are formulated as digital data packets and transmitted to the throttle controller of the locomotive. These data packets are sent at time intervals no greater than a known maximum time interval.

In the throttle controller, information in these data packets is processed to generate signals which are sent to the output driver stage and converted into signals on the trainlines. Software in the CPU of the throttle controller provides for responding to either corruption or loss of transmission of data from the remote host computer.

Signals in the CPU of the throttle controller direct it to respond to either corruption or loss of transmission as follows: The CPU of the throttle controller puts itself in a re-initialization mode, in which it re-initializes itself based on information in its non-volatile memory, perhaps with additional information in mass storage such as disk drives. It also sends a signal to the remote host directing it to re-initialize itself in the same manner.

If re-initialization is not successful at re-establishing communication, signals in the CPU of the throttle controller direct it to step the locomotive power setting to a known power setting. This power setting may be throttle idle, reverser neutral, and dynamic brake off. A modification of this apparatus may provide for the dynamic brake remaining on if it was on when the corruption or loss of transmission occurred.

In order to detect the condition of corruption of transmission, signals in memory in the host computer are provided which direct it to attach signals representing integers for a cyclic redundancy check to the data packet. Likewise, the CPU in the throttle controller has signals in memory directing it to re-calculate the integers for cyclic redundancy check to compare with the integers represented by the received signals.

The throttle controller also has apparatus for resetting a timer whenever a data packet is received from the remote host computer. This is used to determine whether an interval in excess of a maximum time interval occurs between data packets received from the host computer.

The throttle controller also is equipped to receive diagnostic information from the locomotive it is driving, this information including the voltages applied to the trainlines of the locomotive. Signals in the memory of the CPU of the throttle controller direct it to form this diagnostic information into signals representing data packets, and transmit these back to the host computer. This is done with a time interval between transmission of data packets which is no greater than a known, maximum time interval. Also, signals representing integers for a cyclic redundancy check are included with the data packets.

The host computer and the CPU of the throttle controller both have signals in their memories which direct them to create and transmit data packets having the following structure: Two bytes of information as a start flag, one byte which provides an address for the data packet. (This is not needed in point-to-point communication.) One byte of information to indicate the type of data packet, an arbitrary number of bytes for useful information. The useful information may begin with a first header byte which represents the type of information being transmitted, and a second header byte which indicates the software version. After the useful information, there are two bytes for cyclic redundancy check, and then two bytes serving as an end flag for the data packet.

The host computer and the CPU of the throttle controller are programmed with signals in memory directing them to resolve a potential ambiguity between bytes of useful data and bytes serving as an end flag of the data packets as follows.

The first of the two bytes serving as end flag has the numeric value of 16. Whenever this value is encountered in the stream of bytes to be transmitted, it is transmitted twice. In the computer which receives he data packet, whenever the number 16 is received twice in succession, it is interpreted as a single value.

The remote host computer and the throttle controller may be connected by an electrical connection means having three electric conduction paths (wires). The remote host transmits data packets using one of the wires, the throttle controller transmits data packets back using another of the wires, and the third wire provides current return paths for the two transmissions. In effect, the third wire acts as a ground wire.

In another embodiment, communication may be accomplished by a two-way radio link. Data packets are sent one way from the remote host to the throttle controller, and data packets are sent the opposite way from the throttle controller to the remote host.

The remote host computer may also have means to serve a clock function. Signals in its memory may direct it, perhaps once or twice per day, to transmit a data packet which has a first header byte indicating that the information transmitted is date and time. This is followed by signals indicating the date and time.

The remote host computer has means to transmit signals representing digital data packets representing the requested engine throttle setting, reverser position, and dynamic braking.

The throttle controller also has means to transmit signals representing digital data packets representing the positions of control levers in the locomotive which is being controlled.

OBJECTS OF THE INVENTION

The purpose of this invention is to facilitate bi-directional communication of control information between a remote host unit and a slave unit. In particular, it applies to control of a locomotive from a remote host computer. Its purpose is to provide a communications protocol having the following advantages:

(1) It is to be readily adaptable to digital computer technology, providing means for communicating information between the memory of a computer in the remote host unit and the memory of a computer in the slave unit. For ease of adaptation, it is preferred that communication be asynchronous.

(2) It is to provide means for verification of information received, so that if information is corrupted during transmission, the corrupted information can be discarded.

(3) It is to operate in an environment in which it is very likely that communication may be interrupted. Means are provided for determining that communication has been interrupted, and for providing a safe response.

(4) It is to provide growth potential, so that additional control parameters can be added to the signals sent from the host unit to the slave unit, and so that additional diagnostic parameters can be added to the signals sent from the slave unit to the host unit. For information which is already available in memory, these additions should be possible simply by changing the software. For consistency between software versions, a flag indicating the software version is to be transmitted along with the data.

(5) It is to provide for simultaneous two-way transmission of information, so that neither unit needs to verify that the other unit is in a receiving mode before it transmits.

(6) It is to be a serial type of communication, as distinct from parallel, so that it can be readily adapted to radio transmission.

BRIEF DESCRIPTION OF PRESENTLY PREFERRED EMBODIMENTS

Figure 1:
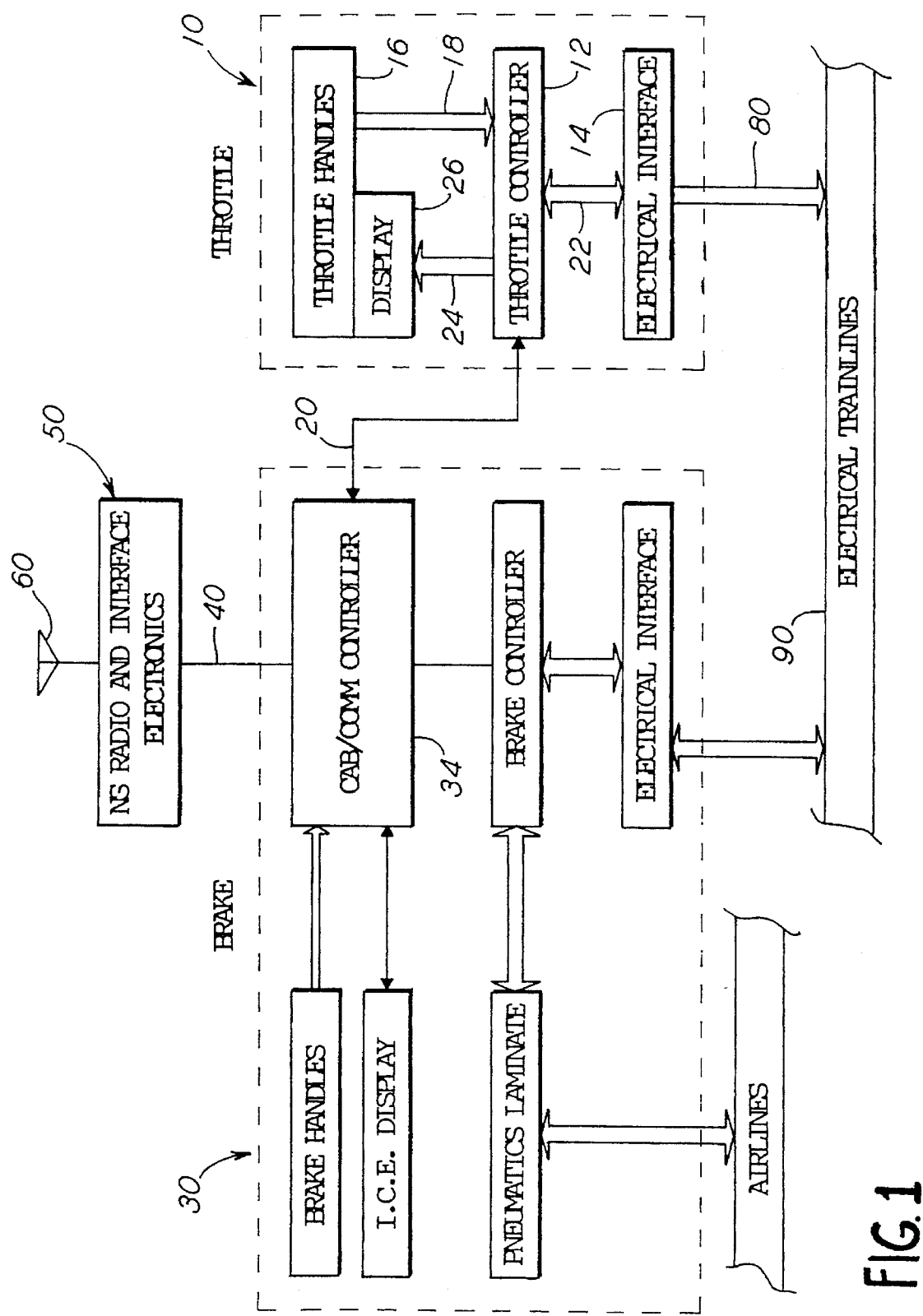
FIG. 1 is a block diagram which illustrates a presently preferred embodiment of this invention.

Reference is now made to FIG. 1 which shows a block diagram illustrating a system having two presently preferred embodiments. Additional understanding of this system can be obtained from the twelve cross-referenced applications cited above.

The throttle system in the remote locomotive is shown generally at 10, and a WABCO EPIC Brake system is indicated generally at 30. A radio interface unit is shown generally at 50.

The throttle system 10 has a throttle controller 12 which includes a CPU digital computer. The throttle controller sends control signals through cable means 22 to an electrical interface unit, 14 which includes an output driver stage which applies electrical signals through cable means 80 to the trainlines 90, which control the locomotive.

Signals indicative of the actual voltages applied to the trainlines are sent from the electrical interface, 14 back to the throttle controller 12 via cable means 22.

The positions of handles 16 for throttle, reverser, and dynamic brake at the engineer's console are sensed by encoders (not shown) and transmitted to the throttle controller 12 through cable means, 18. Information from the throttle controller is fed back to the display unit 26 through cable means, 24.

The WABCO EPIC brake system, 30 includes a Cab/Comm Controller 34, which has a digital computer.

The system includes a Radio and Interface Electronics unit, 50 and radio link 60. The Radio and Interface Electronics Unit, 50 includes a digital computer.

Simultaneous two-way communication of digital data packets is provided between the CPU digital computer in the throttle controller 12 and the digital computer in the Cab/Comm Controller, 34. This is done by link 20, which is a serial data link, which may be RS-232. A first embodiment of the present invention is used for this communication. Data for control of the locomotive in the memory of the digital computer in the Cab/Comm Controller 34 is formed into digital data packets and transmitted over link 20 to the CPU in the throttle controller, 12.

In like manner, diagnostic information in the CPU of the throttle controller, 12, which includes status of the trainlines, and positions of the throttle handles, is formed into data packets and transmitted back to the digital computer in the Cab/Comm Controller, 34.

The invention provides for a safe system response in the event of any failure of the link 20, such as cutting, grounding, pickup of spurious signals, etc.

A second embodiment of the present invention is utilized in link 40 which connects the digital computer in the Cab/Comm Controller, 34 with the digital computer in the Radio and Interface Electronics Unit, 50.

Commands for control of the locomotive, received by the radio link, are placed in the memory of the computer in the Radio and Interface Electronics Unit 50, and are then, by the present invention, formed into digital data packets and transmitted by Link 40, which is a serial communications link, to the memory of the digital computer in the Cab/Comm Controller 34.

In like manner, diagnostic information stored in the memory of the digital computer in the Cab/Comm Controller 34 is formed by the present invention into digital data packets and transmitted to the memory of the computer in the Radio and Interface Electronics Unit 50. This information is then transmitted by radio to the host computer (not shown), which may be in a lead locomotive. The invention provides for a safe system response in the event of any failure of the link 40, such as cutting, grounding, pickup of spurious signals, etc.

A third embodiment of the present invention is contemplated for the system shown in FIG. 1. In this embodiment, the radio link itself provides for simultaneous two-way transmission of digital data packets. Locomotive control commands would be sent from a remote host computer over the radio link 60 to the memory of the computer in the Radio and Interface Electronics Unit, 50. Diagnostic information in the Radio and Interface Electronics Unit 50 would be sent from that unit to the remote host computer over the radio link 60.

The invention provides for a safe system response in the event of any failure of the radio link 60, such as loss of signal due to intervening terrain, pickup of spurious signals, etc.

While presently preferred embodiments of the invention have been described in considerable detail above, with particular reference to the attached drawing figure, it should be understood that various other adaptations and modifications of the invention can be envisioned by those persons who are skilled in the art without departing from the spirit or scope of the appended claims.

We claim:

1. A method for controlling a locomotive from a remote host first computer, said locomotive having a throttle controller equipped with a second computer, said method comprising the steps of:

(a) establishing two-way transmission of signals representing digital data packets between said first computer and said second computer;

(b) transmitting signals representing digital data packets representing engine control commands from said first computer to said second computer at time intervals no greater than a predetermined maximum time interval, each of said data packets including the following bytes disposed sequentially in time, (I) two bytes of data which serve as a start flag for said data packet, (II) one byte of data, which is reserved as an address for said data packet, (III) one byte of data, which is reserved to indicate different types of packet, (IV) two bytes of data, a first header byte representing the type of information represented by said data packet and a second header byte representing a version number, used to facilitate implementation with successive software versions, (V) at least one byte of information, (VI) at least two bytes representing integers calculated for a cyclic redundancy check, and (VII) two bytes which serve as an end flag for said data packet, wherein ambiguity between said at least one information byte in Step (V) and said end flag bytes of Step (VII) is eliminated by the following substeps, (A) using known numeric values for said end flag bytes, (B) selecting a first byte of said end flag bytes, and, whenever the numeric value of said first byte appears in the stream of bytes to be transmitted, transmitting its numeric value twice in sequence, and (C) in said second computer, interpreting said twice transmitted numeric value as a single byte of information, and not as an end flag;

(c) driving signals on trainlines via said throttle controller means based on said engine control commands; and (d) responding to one of corruption of transmission and loss of transmission from said first computer.

2. The method of claim 1 wherein Step (e) further comprises the steps of:

(I) re-initializing said second computer based on instructions in one of non-volatile memory and non-volatile memory plus mass storage, and (II) sending a signal from said second computer to said first computer directing it to re-initialize itself based on instructions in one of non-volatile memory and non-volatile memory plus mass storage.

3. The method of claim 1, wherein Step (e) further comprising the procedure of stepping said locomotive to a known power setting, said procedure being performed in the event of a continued condition of one of corruption of transmission and loss of transmission from said first computer to said second computer.

4. The method of claim 3 wherein said known power setting comprises throttle idle, reverser neutral and dynamic brake off.

5. The method of claim 1 wherein said corruption of transmission in Step (e) is detected by a procedure which comprises the following steps:

(I) recalculating for said cyclic redundancy check said integers based on received digital data packets in said second computer; and (II) comparing said integers transmitted with said digital data packet from said first computer with said integers recalculated in said second computer.

6. The method of claim 1 wherein said loss of transmission is detected in said second computer by a procedure which comprises the following steps:

(I) resetting a timer when a digital data packet is received from said first computer, said timer generating a signal indicative of time elapsed since receipt of said digital data packet; and (II) comparing said signal indicative of time elapsed with a signal corresponding to said maximum time interval.

7. The method of claim 1 further comprising the steps of:

(f) providing in said throttle controller means for feeding back to said second computer diagnostic information including information indicative of trainline status;

(g) providing in said second computer means for encoding said diagnostic information into digital data packets;

(h) transmitting signals representing said digital data packets from said second computer back to said first computer at time intervals no greater than a known maximum time interval; and (i) including with said digital data packets signals representing integers for cyclic redundancy check.

8. The method of claim 7 wherein Step (f) further comprises providing means for sending information regarding the positions of the levers for throttle, reverser, and dynamic brake in said slave locomotive to said second computer, Step (g) further comprises encoding this information along with other diagnostic information, and Step (h) further comprises transmitting this information back to said first computer.

9. The method of claim 1 wherein in Step (c) said at least one information byte contains information indicative of the requested engine throttle setting, reverser position, and dynamic braking.

10. The method of claim 1 wherein Step (b) comprises connecting said first computer to said second computer by electric connection means having at least three electric conduction paths.

11. The method of claim 10 further comprising the steps of:

(I) transmitting digital data packets from said first computer to said second computer on a first one of said at least three electric conduction paths;

(II) transmitting digital data packets from said second computer to said first computer on a second one of said at least three electric conduction paths; and (III) providing a third one of said at least three electric conduction paths as a current return path for said first conduction path and for said second conduction path.

12. The method of claim 1 wherein Step (b) comprises the step of using a radio link capable of simultaneous two-way communication.

13. The method of claim 1 wherein in Item (IV) at least one of said header bytes indicates that the type of information represented is date and time, and wherein in Item (V) said at least one information byte is indicative of date and time.

14. An apparatus for controlling a locomotive from a remote host first computer, said apparatus comprises:

(a) a throttle controller for driving signals on trainlines in said locomotive, said throttle controller having a second computer;

(b) said remote host first computer through which said locomotive is controlled via said second computer;

(c) means disposed in said first computer for receiving signals indicative of engine control commands, and for representing these commands as signals formed as digital data packets;

(d) means for two-way transmission of signals formed as digital data packets between said first computer and said second computer at time intervals no greater than a known maximum time interval, said means for two-way transmission including a means for transmitting sequentially in time for each of said data packets, (I) signals representing two bytes of data which serve as a start flag for said data packet, (II) signals representing one byte of data, which is reserved as an address for said data packet, (III) signals representing one byte of data, which is reserved to indicate different types of packet, (IV) signals representing two bytes of data, a first header byte representing the type of information represented by said data packet and a second header byte representing a version number, used to facilitate implementation with successive software version, (V) signals representing at least one byte of information, (VI) signals representing integers in form of two bytes calculated for a cyclic redundancy check, and (VII) signals representing two bytes which serve as an end flag for said data packet, wherein ambiguity between signals representing said at least one information byte Item (V) and signals representing said end flag bytes of Item (VII) is resolved by the following subitems, (A) means for defining known numeric values for said two end flag bytes, (B) means for selecting a first byte of said two end flag bytes, and, whenever the numeric value of said first byte appears in the stream of bytes to be transmitted, transmitting signals representing its numeric value twice in sequence, and (C) means disposed in said second computer for interpreting said signals transmitted twice in sequence as a single byte of information, and not as an end flag;

(e) means disposed in said second computer for receiving said signals formed as digital data packets, and for generating signals for driving the trainlines of said locomotive; and (f) means disposed in said second computer for responding to one of corruption of transmission and loss of transmission from said first computer.

15. The apparatus of claim 14 wherein in Item (d) said at least one information byte contains information indicative of the requested engine throttle setting, reverser position, and dynamic braking.

16. The apparatus of claim 14 wherein in Item (IV) at least one of said header bytes indicates that the type of information represented is date and time, and wherein in Item (V) said at least one information byte is indicative of date and time.

17. The apparatus of claim 14 wherein Item (e) further comprises:

(I) means for re-initializing said second computer based on instructions in one of non-volatile memory and non-volatile memory plus mass storage, and (II) means for sending a signal from said second computer to said first computer directing it to re-initialize itself based on instructions in one of non-volatile memory and non-volatile memory plus mass storage.

18. The apparatus of claim 14 wherein Item (e) further comprises means for stepping said locomotive to a known power setting, said means being activated in the event of a continued (II) means disposed in said second computer for transmitting signals representing digital data packets to said first computer on a second electric conduction path; and (III) means for using a third electric conduction path as a current return path for said signals transmitted by Items (I) and (II).

19. The apparatus of claim 14 wherein Item (f) further comprising:

(I) means for recalculating for said cyclic redundancy check said integers based on said signals representing digital data packets received in said second computer; and (II) means for comparing said integers transmitted with said digital data packet from said first computer with said integers recalculated in said second computer.

20. The apparatus of claim 14 wherein Item (f) further comprising:

(I) means disposed in said second computer for resetting a timer when a signal representing a digital data packet is received from said first computer, said timer generating a signal indicative of time elapsed since receipt of said digital data packet; and (II) means disposed in said second computer for comparing said signal indicative of time elapsed with a signal corresponding to said maximum time interval.

21. The apparatus of claim 14 further comprising:

(f) means disposed in said throttle controller for feeding back to said second computer diagnostic information including information indicative of trainline status;

(g) means disposed in said second computer for encoding said diagnostic information into signals representing digital data packets;

(h) means for transmitting signals representing said digital data packets from said second computer back to said first computer at time intervals no greater than a known maximum time interval; and (i) means for including with said digital data packets signals representing integers for a cyclic redundancy check.

22. The apparatus of claim 21 wherein Item (f) provides means for transmission of signals representing positions of control levers in said slave locomotive, back to said first computer.

23. The apparatus of claim 14 wherein Item (c) comprises a pair of radio transmitter and receiver combinations for simultaneous two-way radio communication.

24. The apparatus of claim 14 further comprising:

(I) means disposed in said first computer for transmitting signals representing digital data packets to said second computer on a first electric conduction path;

(II) means disposed in said second computer for transmitting signals representing digital data packets to said first computer on a second electric conduction path; and (III) means for using a third electric conduction path as a current return path for said signals transmitted by Items (I) and (II).

* * * * *

UNITED STATES PATENT AND TRADEMARK OFFICE
CERTIFICATE OF CORRECTION

PATENT NO. : 5,570,284
DATED : October 29, 1996
INVENTOR(S) : Leonard Roselli, et al.

It is certified that error appears in the above-identified patent and that said Letters Patent is hereby corrected as shown below:

Column 2, line 13, please delete "fro" and insert --from--;
column 2, line 21, after "industry", please insert --,--.
Column 8, line 2, please delete "he" and insert --the--.
Column 12, line 57, after "software", please delete "version" and insert --versions--;
column 12, line 65, after "byte", please insert --in--.
Column 13, line 40, after "continued", please insert --condition of one of corruption of transmission and loss of transmission from said first computer to said second computer--;
column 13, lines 41-46, please delete "(II) means disposed in said second computer for transmitting signals representing digital data packets to said first computer on a second electric conduction path; and (III) means for using a third electric conduction path as a current return path for said signals transmitted by Items (I) and (II)";
column 13, line 47, after "14", please insert --,--.
Column 14, line 6, after "14", please insert --,--.

Signed and Sealed this

Twenty-first Day of July, 1998

Attest:

Attesting Officer

BRUCE LEHMAN

Commissioner of Patents and Trademarks